No. 616,665. Patented Dec. 27, 1898.
W. E. HARTZELL.
BICYCLE PROPULSION.
(Application filed Dec. 11, 1897.)
(No Model.)
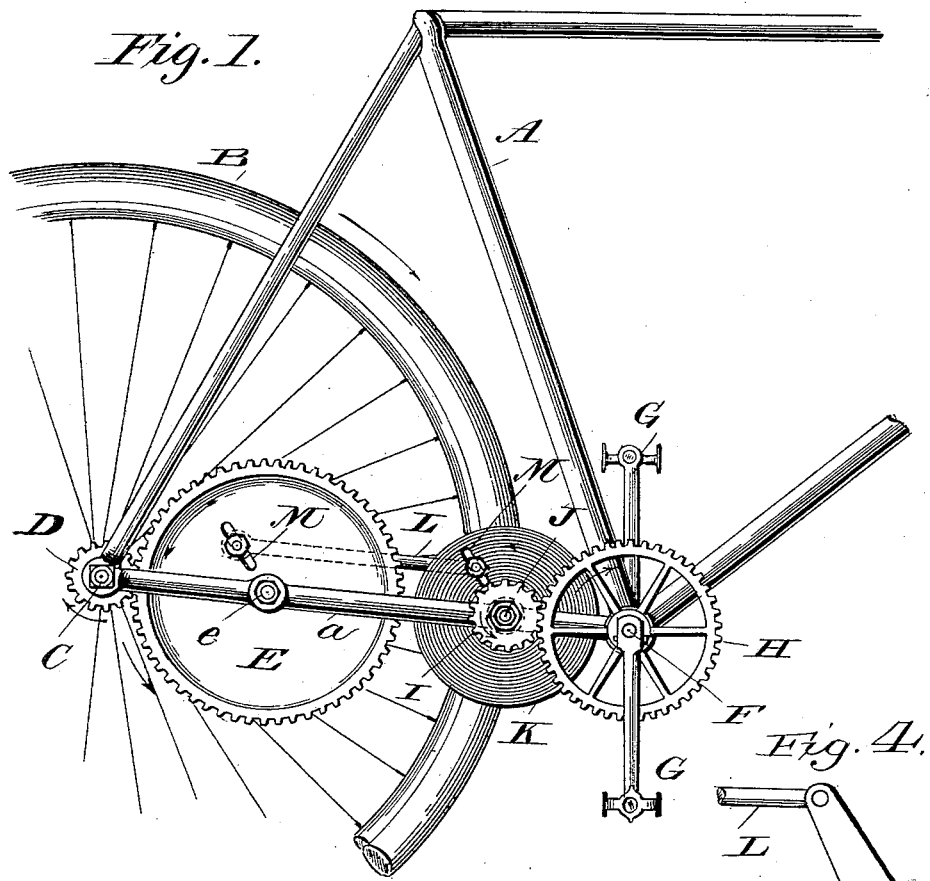
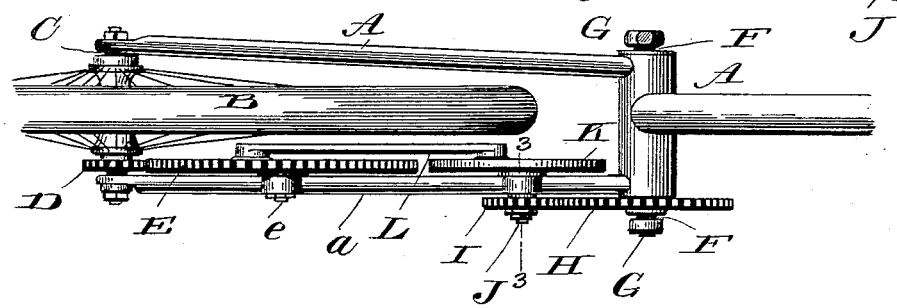
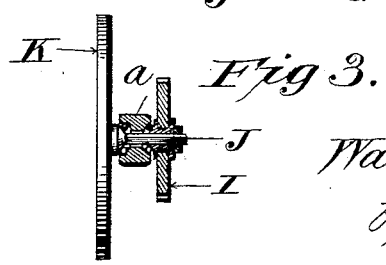
Inventor:
Walter E. Hartzell,
by E. H. Bond
Attorney
Witnesses
L. C. Hills.
R. R. Bond.

UNITED STATES PATENT OFFICE.

WALTER E. HARTZELL, OF WASHINGTON, DISTRICT OF COLUMBIA.

BICYCLE PROPULSION.

SPECIFICATION forming part of Letters Patent No. 616,665, dated December 27, 1898.

Application filed December 11, 1897. Serial No. 661,482. (No model.)

*To all whom it may concern:*

Be it known that I, WALTER E. HARTZELL, a citizen of the United States, residing at Washington, in the District of Columbia, have invented certain new and useful Improvements in Bicycle Propulsion; and I do hereby declare the following to be a full, clear, and exact description of the invention, such as will enable others skilled in the art to which it appertains to make and use the same.

This invention relates to certain new and useful improvements in bicycles and the like of that class in which the chain is dispensed with and in which are employed gears.

The present invention has for its object, among others, to provide an improved means for bicycle propulsion of this character in which shall be combined great strength, power, speed, and lightness. I aim to avoid all lost power and provide for the direct application of the power from the pedals. The speed may be varied by changing two of the gears. The mechanism is simple in its structure, compact, not liable to become deranged or injured, and in practice will be found to be most applicable to the purposes for which it is intended.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a side elevation of a portion of a bicycle, showing my improvement applied thereto. Fig. 2 is a top plan thereof. Fig. 3 is a sectional detail on the line 3 3 of Fig. 2. Fig. 4 is a detail which will be more particularly hereinafter referred to.

Like letters of reference indicate like parts throughout the several views.

The invention in this instance is illustrated as applied to a bicycle of the type known as "safety;" but it is evident that it is applicable to other forms, as well as to tricycles and other styles of road-vehicles. Therefore in the following claim it is to be understood that the invention is not restricted to any particular kind of machine. It is herein shown in connection with a portion of the frame of a safety merely for convenience in illustration.

Referring then to the details of the drawings by letter, A designates a portion of the frame of a bicycle, B the rear wheel, and C the rear axle. In this instance the lower horizontal bar $a$ of the frame is shown as substantially parallel with the line of travel of the wheel, while the corresponding bar upon the opposite side of the wheel is of usual construction, being slightly inclined inward at the front end.

On the rear axle inside the frame—that is, between the bar $a$ and the wheel—is a gear D, which may be of any desired diameter, which gear is designed to mesh with the large gear E, carried by a short shaft or axle $e$, supported in the bar $a$ of the frame, as seen best in Fig. 2, the said gear being of course arranged upon the inside of the frame in line with the gear D, as shown best in said Fig. 2.

Upon the crank-axle F, carrying the cranks and pedals G of any well-known form, is the gear-wheel H, arranged, as shown, upon the outside of the bar $a$ of the frame, and this gear is designed to mesh with a small gear I, which is carried upon the outer end of the shaft or axle J, which is supported in the bar $a$, and upon this shaft or axle, upon the inside of the frame, is the drive-wheel K, in line with the gear-wheel E.

L is a bar or pitman connecting the drive-wheel with the large gear-wheel E. The mode of connection between the ends of the bar and the wheel and gear may be any that is suited to the purpose. It is by preference such that the inner face of the bar shall be flush, so as not to offer any projections or protuberances that might possibly be caught in the spokes of the wheel. The nuts should be on the outside, so as to present convenient means for adjustment.

I propose to employ ball-bearings at all points where they can be used; but as such provisions are of such well-known character a showing thereof is not deemed necessary, although in Fig. 3 I have shown ball-bearings in connection with one of the shafts. The others should be likewise provided.

Modifications in detail may be resorted to without departing from the spirit of the invention or sacrificing any of its advantages.

In lieu of the drive-wheel K, I may employ an arm, as indicated in Fig. 4, the result being substantially the same. It is preferred, however, to employ the wheel, as indicated in Fig. 1.

The operation will be readily understood. The direction of rotation of the parts is illustrated by arrows in Fig. 1. The speed may be varied by removing the gears H and I and replacing them with others of different diameters.

The gear E and the drive-wheel K are shown as provided with slots, as indicated at M in Fig. 1, which are disposed radially, so that the connections of the arm or bar L therewith may be adjusted to or from the centers of said gear and wheel or arm, the connections between the ends of the bar and the parts with which they are connected being such as to allow of such adjustment and when adjusted to securely hold the ends of the bar in position. The two ends of the arm are adjusted simultaneously, and it is essential that their points of connection should be the same distance from the centers of the wheels in order to operate successfully. By reason of this adjustment the ends of the pitman may be brought nearer to or farther from the centers of the wheel and gear to which they are attached, according to the varying diameters of the gears H and I, and the strain upon the pitman thus prevented from doing injury to any of the parts. Other such changes I should consider as fully within the scope of my invention.

What is claimed as new is—

The combination of a bicycle-frame, its crank-axle, a gear on said crank-axle outside the frame, a stub-shaft on the frame, a gear on the outer end thereof meshing with the gear on the crank-shaft, a drive-wheel on the inner end of the stub-shaft inside the frame, a gear on the rear axle inside the frame, a stub-shaft on the frame, a large gear on the inner end of said stub-shaft in line with the drive-wheel and meshing with the gear on the rear axle, and a pitman connected at one end directly to the inner face of the drive-wheel and its other end connected directly to the inner face of the large gear, all substantially as and for the purpose specified.

In testimony whereof I affix my signature in presence of two witnesses.

WALTER E. HARTZELL.

Witnesses:
E. H. BOND,
WM. L. FORD.